United States Patent [19]
De Luca et al.

[11] Patent Number: 4,824,403
[45] Date of Patent: Apr. 25, 1989

[54] TELEPHONE CONNECTOR BLOCK FOR CRADLE TYPE INSTALLTION

[75] Inventors: Paul V. De Luca, Plandome Manor; William V. Carney, Oyster Bay; Helmuth Neuwirth, Garden City; Michael Fasano, Huntington, all of N.Y.

[73] Assignee: Porta Systems Corp., Syosset, N.Y.

[21] Appl. No.: 144,040

[22] Filed: Jan. 15, 1988

[51] Int. Cl.⁴ .............................................. H01R 9/22
[52] U.S. Cl. ..................................... 439/714; 439/719
[58] Field of Search ............... 439/709, 714, 715, 719, 439/721, 402, 404, 49

[56] References Cited

U.S. PATENT DOCUMENTS

| Re. 31,714 | 10/1984 | Knickerbocker | 439/402 |
| 4,099,823 | 7/1978 | D'Alessio | 439/719 |
| 4,381,880 | 5/1983 | Pohl | 439/719 |
| 4,390,230 | 6/1983 | Knickerbocker | 439/716 |
| 4,512,622 | 4/1985 | Carney et al. | 439/449 |
| 4,575,168 | 3/1986 | Thomas | 439/507 |

Primary Examiner—Neil Abrams
Attorney, Agent, or Firm—Charles E. Temko

[57] ABSTRACT

A telephone connector block with slotted openings and having shaped wire guide elements located in said slotted openings particularly suited for bracket or cradle type installation with or without a wall-mounted backboard. This block offers total front administration with the possibility of rear connection for cutover and test access by temporarily disconnecting the block from the cradle. Improved strain relief is obtained by threading the individual conductors into angularly configured passageways leading to front mounted quick clip connectors.

3 Claims, 3 Drawing Sheets

TELEPHONE CONNECTOR BLOCK FOR CRADLE TYPE INSTALLTION

BACKGROUND OF THE INVENTION

This invention relates generally to the field of telephony, and more particularly to an improved connector block for relatively small numbers of subscriber pairs adapted to be installed in locations other than mainframe or other central office areas. Typical of such locations are buildings having PBX installations, data transmission lines and the like. In such locations it is common to use blocks the dimensions of which correspond to the Type 66 Western Electric block, which services up to one hundred subscriber pairs.

In this construction, the block is usually wired on location in such manner that it may be thereafter manually pressed into position upon a previously installed cradle, the cradle, in turn, being mounted upon a wall or other vertical supporting surface.

Prior art blanks of the cradle-mounted type are in relative widespread use and more recent models offer the advantages of quick clip connectors which are exposed in a forward direction to permit not only rapid conductor engagement, but the advantage of using the exposed ends of the quick clip connectors for installation of protector devices as well. In installations of this type, the block is fitted relatively closely into the cradle, so that connections on the rear of the block are normally not feasible.

SUMMARY OF THE INVENTION

Briefly stated, the invention contemplates the provision of an improved connector block of the type described offering improved utility when compared with similar prior art devices. The block, which is generally rectangular in cross section is mounted in spaced parallel relation relative to the base of the cradle to provide an interstice into which cable pairs may be introduced for distribution to terminals on the block. The cradle includes wire guides adjacent forward edges of the same, through which subscriber pairs are conducted to the side surfaces of the block for introduction to conductor passageways leading to forwardly mounted quick clip terminals. These passageways provide a strain relief function in addition to that of strain relief means adjacent the individual quick clip terminals. The inner ends of the quick clip terminals can be accessed from a vertical rearwardly facing surface of the block. Adjacent quick clip terminals may be selectively bridged by a resilient cutover or test access clip, also accessible from the rear surface of the block when installed. Improved forwardly facing grounding means is provided which serves the dual function of locking individual laminar inserts forming wire guide means in predetermined position.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
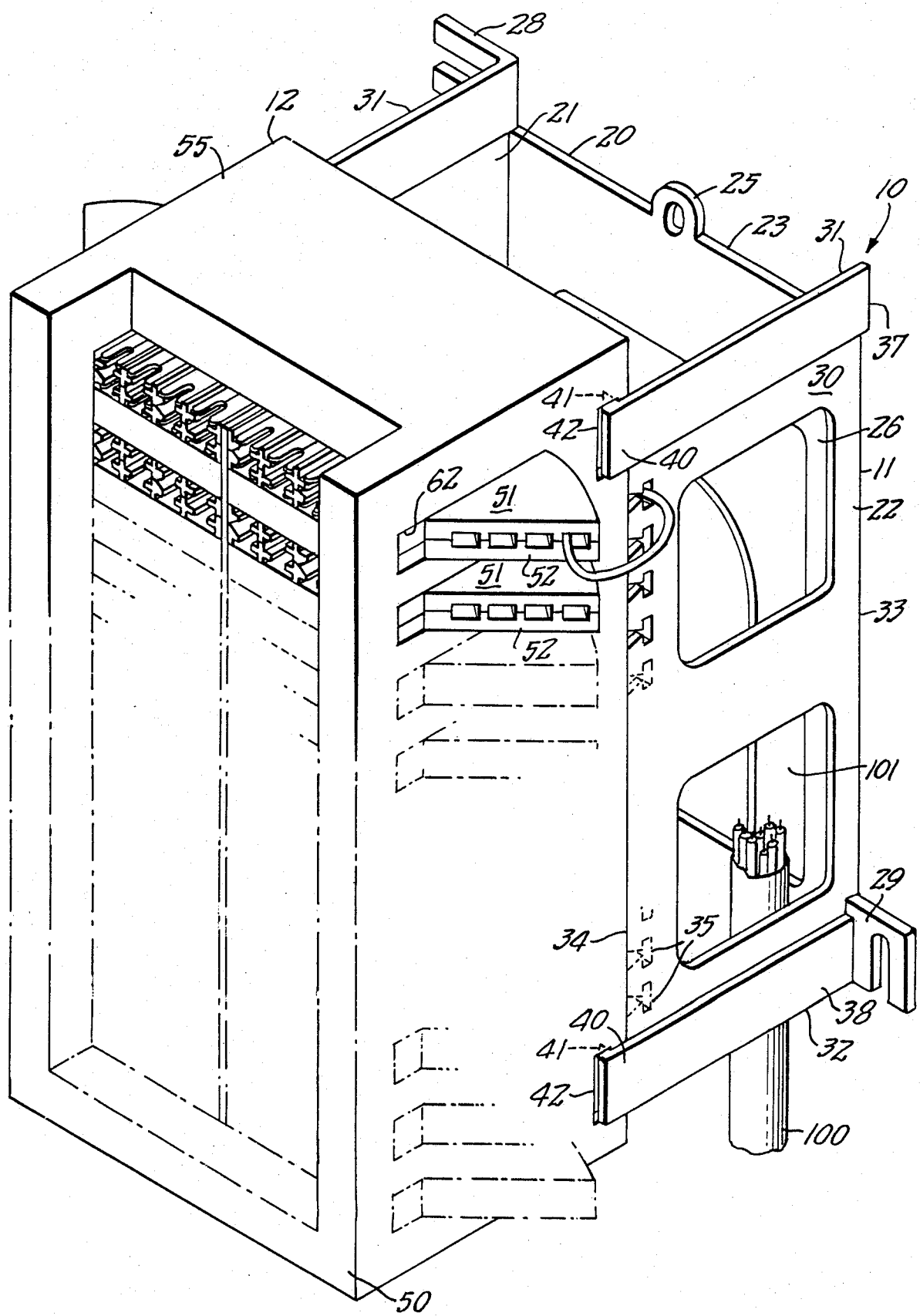
FIG. 1 is a fragmentary view in perspective of an embodiment of the invention.

In accordance with the invention, the device, generally indicated by reference character 10, comprises broadly: a cradle element 11 and a block element 12.

The cradle element 11 is preferably formed as a synthetic resinous molding, and includes a base wall 20, and first and second side walls 21 and 22. The base wall is bounded by upper and lower edges 23 and 24, and incorporates mounting means 25 of known type. Through openings 26 permit the installation of connectorized means (not shown) where desired. Adjacent longitudinal edges 27 are additional mounting means 28 and 29 of known type.

The side walls 21 and 22 are similar and symmetrical, each including a planar portion 30 bounded by an upper edge 31, a lower edge 32, a rear edge 33 and a forward edge 34. Adjacent the edge 34 are wire guide openings 35, as are upper and lower resilient retaining members 37 and 38 which retain the block element 12 in position following installation. The forward ends 40 thereof have retaining teeth 41 which correspond to recesses 42 in the block.

The block element 12 incorporates certain structural features disclosed in U.S. Pat. No. 4,512,622 granted Apr. 23, 1985 to William V. Carney, et al., and assigned to the same assignee as the present application. In this type of block, a plurality of slotted openings are provided in a front wall and an adjacent side wall which permit the entry of laminar wire guide means having individual wire channels. At one end of the channels, the block supports adjacent quick clip terminals, while at the other end of the channels, the wires are conducted away from the block to another point of interconnection. The principal advantage of this type of construction is that it enables the craftsperson to keep track of subscriber pairs as they are installed, to a degree which is not possible with other types of block construction. The block disclosed in the above-mentioned patent is suitable for mainframe installation, and owing to its configuration, it is not suitable for incorporation into blocks having a Type 66 footprint.

Figure 2:
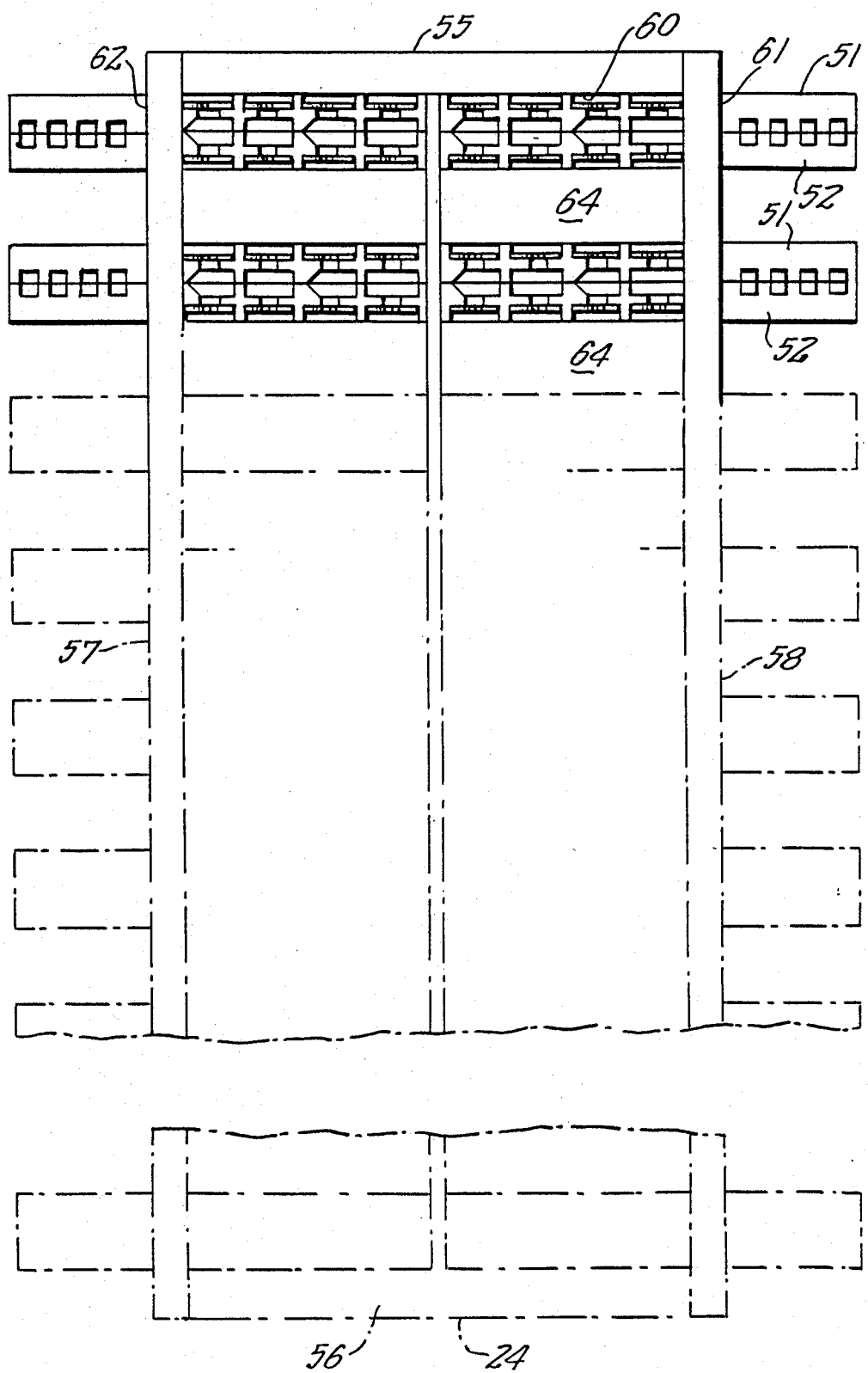
FIG. 2 is a fragmentary front elevational view thereof.
Figure 3:
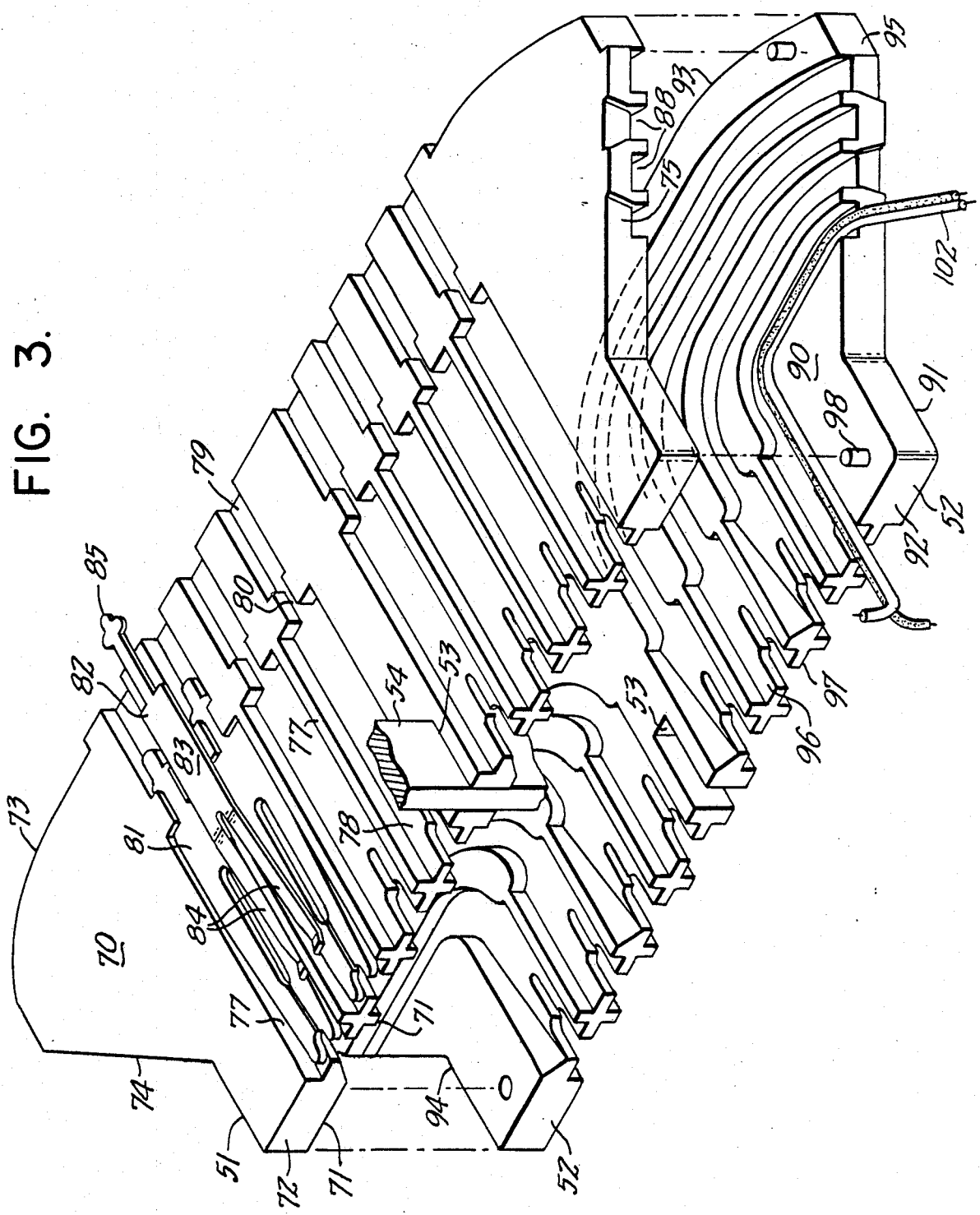
FIG. 3 is an enlarged exploded view in perspective showing certain planar wire guide elements forming a part of the disclosed embodiment.

The element 12 is also suitably formed as a synthetic resinous molding, and includes an outer housing element 50, a plurality of first laminar elements 51 and a plurality of second laminar elements 52 positioned with slots 53. These are best understood from a consideration of FIG. 2 in the drawing.

The housing element 50 includes an upper wall 55, a lower wall 56, and first and second side walls 57 and 58.

Facing forwardly are a plurality of flat rectangular openings 60 in coplanar orientation with corresponding side openings 61 and 62, as well as coplanar rear openings (not shown). These openings are separated by horizontal septums 64 which form corresponding parallel interstices 65.

Disposed in the interstices 65 are the planar elements 51 and 52. The elements 51 which form an upper part of each guide element interconnect with the elements 52, in the manner disclosed in the above-mentioned patent.

Each element 51 is bounded by an upper surface 70, a lower surface 71, a forward surface 72 and a rearward surface 73, as well as angularly disposed end surfaces 74 and 75. Extending from the surface 70 are parallel transverse channels 77, each including a forward rectangular portion 78, a rearward rectangular portion 79, and a connecting neck 80. Disposed in each channel 77 is a single terminal quick clip connector 81. Selectively overlying adjacent pairs of terminals 81 is a cutover access clip element 82 including a main body 83 having forwardly extending resilient tines 84 and a rear contact 85 which projects rearwardly of the housing element 50 for convenient interconnection of test equipment, or for other purposes. The lower surface 71 is provided with curved channels 88, each of which forms one-half of a wire guiding passageway.

The elements 52 are generally symmetrical in configuration relative to the elements 51, each including an upper surface 90, a lower surface 91, a forward surface 92, a rearward surface 93 and end surfaces 94 and 95. The upper surface 90 is provided with channels 96 corresponding to channels 88, while the lower surface 91 includes channels 97 corresponding to the channel 77. The elements 50 and 51 are assembled by means of pins 98 engaging corresponding recesses (not shown).

Each of the elements 51 and 52 includes a generally rectangular recess 53 accommodating a portion of an elongated ground strip 54, which not only provides the usual grounding function, but also provides a means for locking assembled wire guide elements in fixed relative position within the block.

The block is capable of accommodating the usual 100 pair cable designated by reference character 100, which is led into a vertical interstice 101 wherein the individual pairs 102 may be conducted through the wire guide openings 35 to permit entry into the abutted elements 51 and 52. Insertion of the conductors brings them to the forward surface of the block where they may be engaged with the quick clip terminals 81 in known manner. In addition, however, by providing the cutover clip 82, it is possible to provide connections at the rear of the block for test functions and the like, the cradle permitting ready manual detachment for this purpose.

We wish it to be understood that we do not consider the invention limited to the precise details of structure shown and set forth in this specification, for obvious modifications will occur to those skilled in the art to which the invention pertains.

We claim:

1. In a telephone connector block of a type including a first exposed wall mounting a plurality of quick clip connectors for engaging individual subscriber pairs, insertable channel means for guiding individual parts of conductors through said block to exit therefrom at identified locations for subsequent external connection, said first exposed wall having plural slotted openings, said block having second and third exposed walls disposed at right angles relative to said first exposed wall, said insertable channel means extending through slotted openings in said first, second and third exposed wall, the improvement comprising: said channel means extending outwardly of said second and third walls and having edge surfaces lying in planes disposed at an angle less than a right angle with respect to the plane of said first exposed wall, said edge surfaces providing entry to channels leading internally to said quick clip connectors, whereby to facilitate entry of conductors fed from an area adjacent said first exposed surface.

2. In a telephone connector block of a type including a first exposed wall, a second exposed wall disposed at substantially a right angle with respect to said first wall, said walls forming pluralities of communicating slots and a plurality of planar guide elements positioned within said slots, the improvement comprising: each of said guide elements defining a recess adjacent an edge thereof in predetermined location, such that positioning said guide elements within said slots serves to position said recess in each guide element in mutually coaxial relation; and an elongated ground strip positioned within said recesses in each of said guide elements serving to lock said guide elements in fixed position within said block.

3. A telephone connector block including a front wall, an oppositely disposed rear wall, and slotted openings extending between said front and rear walls, laminar wire guide means disposed within said slotted openings, said wire guide means defining channels therein for the accommodation of conductors on at least one planar surface thereof, and generally elongated recesses on a second surface thereof extending between said front and rear walls, quick clip connector terminals disposed within said elongated recesses, and briding clip means electrically communicating with adjacent pairs of quick clip terminals and extending rearwardly of said rear wall to allow communication therewith rearwardly of said rear wall.

* * * * *